US005387052A

United States Patent [19]

Artzberger

[11] Patent Number: 5,387,052

[45] Date of Patent: Feb. 7, 1995

[54] DRIVE MECHANISM FOR A VIBRATORY COMPACTOR

[75] Inventor: Thomas G. Artzberger, Hartford, Wis.

[73] Assignee: M-B-W Inc., Slinger, Wis.

[21] Appl. No.: 28,318

[22] Filed: Mar. 9, 1993

[51] Int. Cl.[6] ....................... E01C 19/38; F16H 33/20; F16D 43/24

[52] U.S. Cl. ....................................... 404/133.1; 74/61; 192/48.91; 192/51; 192/105 BA; 474/7

[58] Field of Search .................... 74/61, 87; 192/48.91, 192/51, 105 BA; 474/7; 404/133.1

[56] References Cited

U.S. PATENT DOCUMENTS

| | | | |
|---|---|---|---|
| 2,908,206 | 10/1959 | Melanson | 404/133.1 |
| 3,048,089 | 8/1962 | Kaltenegger | 404/117 |
| 3,109,326 | 11/1963 | Holtan | 192/48.91 X |
| 3,603,224 | 9/1971 | Dresher | 404/133.1 |
| 3,703,127 | 11/1972 | Kaltenegger | 94/48 |
| 3,730,037 | 5/1973 | Purrer | 83/68 |
| 3,753,621 | 8/1973 | Dale | 404/116 |
| 4,031,761 | 6/1977 | Fisher et al. | 74/15.63 |
| 4,061,000 | 12/1977 | Jacobs | 192/51 X |
| 4,133,225 | 1/1979 | Love | 74/750 R |
| 4,237,983 | 12/1980 | Allen | 172/42 |
| 4,289,042 | 9/1981 | Brown | 74/61 |
| 4,499,779 | 1/1985 | Maass | 74/61 |
| 4,643,611 | 2/1987 | Pilachowski | 404/133 |
| 5,064,053 | 11/1991 | Baker | 198/753 |
| 5,125,488 | 6/1992 | Green et al. | 474/7 X |
| 5,149,225 | 9/1992 | Artzberger | 404/133 |

FOREIGN PATENT DOCUMENTS

| | | |
|---|---|---|
| 1634492 | 6/1970 | Germany . |
| 1634246 | 7/1970 | Germany . |

*Primary Examiner*—Allan D. Herrmann

*Attorney, Agent, or Firm*—Andrus, Sceales, Starke & Sawall

[57] ABSTRACT

A vibratory compactor includes a frame which carries a soil compacting plate, and a drive mechanism such as a gasoline engine, is mounted on the frame and has a rotatable drive shaft. A pair of eccentricly weighted shafts are mounted for rotation on the frame and the weights are in the same phase relation on the shafts. The drive shaft carries a pair of pulleys and single belt connects the pair of pulleys on the drive shaft to pulleys on the eccentric shafts. The drive shaft is connected to the drive shaft pulleys through a centrifugal clutch, which acts to selectively connect the drive shaft to one or the other of the drive shaft pulleys to thereby effect forward and reverse travel of the compactor plate of the compactor over the terrain.

16 Claims, 2 Drawing Sheets

FIG.1
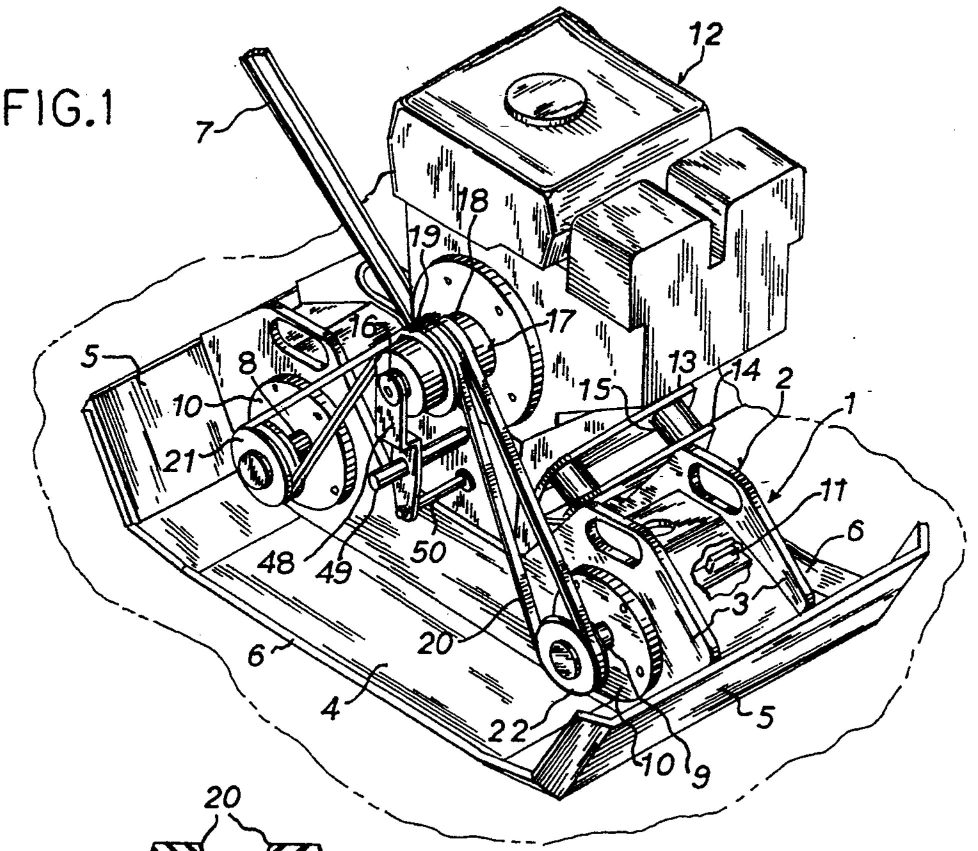
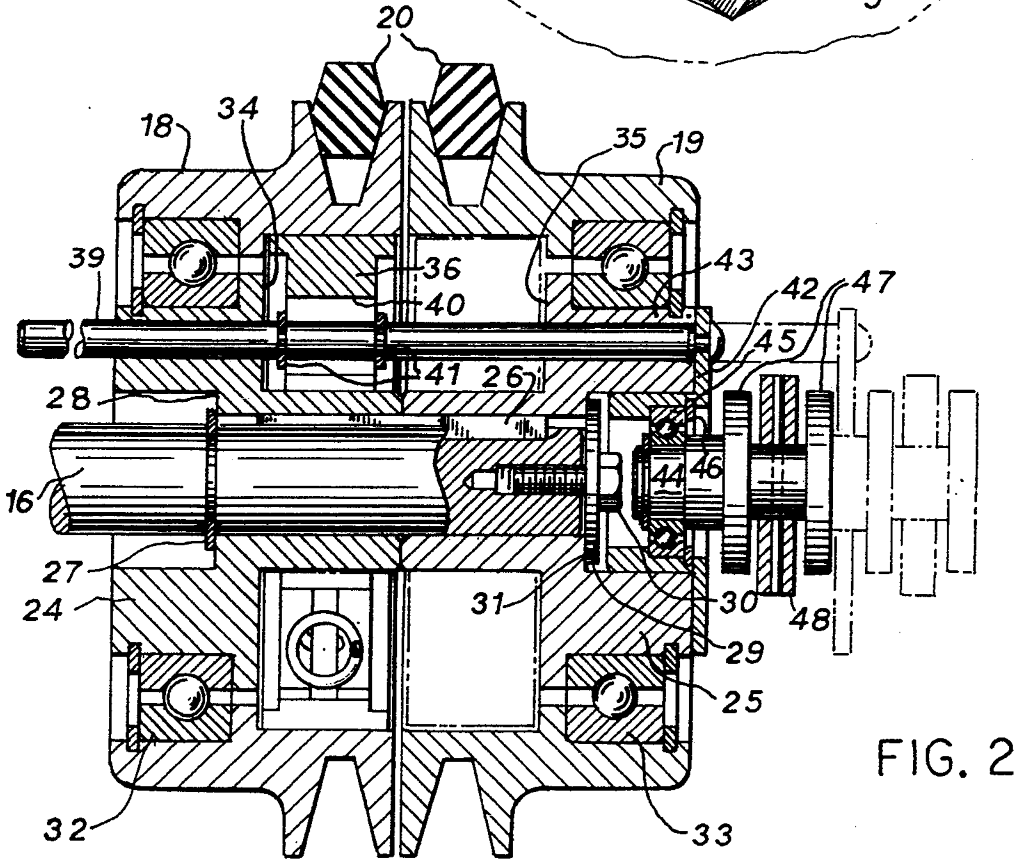
FIG. 2

DRIVE MECHANISM FOR A VIBRATORY COMPACTOR

BACKGROUND OF THE INVENTION

A typical walk-behind soil compactor includes a frame that carries a generally horizontal compaction plate which is adapted to engage and compact soil or other material. To provide vibratory compacting action, one or more eccentric shafts are journaled for rotation on the frame and a power source, such as a gasoline engine, is mounted on the frame. The drive shaft of the engine is operably connected to the eccentric shafts to rotate the eccentric shafts and provide the vibratory motion.

A walk-behind compactor can either be unidirectional, in which the compactor will move only in a single direction over the terrain, or it can be bidirectional or reversible. In a conventional reversible soil compactor, the engine drive shaft is connected to the eccentric shafts through a gear train, which is arranged so that the eccentric shafts rotate simultaneously and in opposite directions. To provide forward and rear movement for the compactor, the phase relationship of the weights on the eccentric shafts is changed by a shifting mechanism. The typical shifting mechanism is very complex and as it is directly associated with the eccentric shafts, the shifting mechanism is subject to intense vibration, and therefore has a relatively short service life.

As a further problem, the eccentric shafts are continuously rotating in opposite directions, so that torque generated by one shaft will oppose the torque generated by the second eccentric shaft. Because of this, and the weight resulting from the complex shifting mechanism, the speed of travel of the compactor is substantially reduced over a similarly powered unidirectional compactor.

U.S. Pat. No. 5,149,225 is directed to an improved, reversible, walk-behind compactor, in which a reversible clutch is associated with the drive shaft of the engine and selectively connects each eccentric shaft via a separate drive belt to the drive shaft. The drive belts are arranged so that the eccentric shafts are rotated in opposite directions, but not simultaneously. With the construction of the aforementioned patent, only one drive belt is engaged at any instant, so that the torque generated by one eccentric shaft does not oppose or fight the torque generated by the second eccentric shaft, thus enabling the speed of travel to be increased with the same power input.

U.S. patent application Ser. No. 07/894,527, filed Jun. 5, 1992, discloses an improved reversible drive mechanism for a walk-behind vibratory compactor. A reversible clutch is associated with the drive shaft of the engine and selectively connects the drive shaft, via separate drive belts, to the respective eccentric shafts. The drive belts are arranged so that the eccentric shafts operate in opposite directions. By connecting one of the eccentric shafts to the drive shaft, the compactor will move in a forward direction and conversely, by connecting the other of the eccentric shafts to the drive shaft, the compactor will move in a reverse direction.

During a period of use the separate drive belts, as used in the construction of U.S. Pat. No. 5,149,225, and the aforementioned patent application, will tend to loosen, and tension on the belts is adjusted by moving the engine, including the drive shaft, both in a vertical direction and in a horizontal direction. As adjustment of the tension on one belt effects the tension on the other belt, it is a very difficult and time consuming task to properly adjust the tension for both of the drive belts.

SUMMARY OF THE INVENTION

The invention is directed to an improved drive mechanism for a walk-behind vibratory compactor. The compactor includes a frame that carries a compactor plate which is adapted to engage and compact soil or other material. A pair of eccentricly weighted shafts are journaled for rotation on the frame and the weights on the eccentric shafts are in the same phase relationship.

In accordance with the invention, a pair of pulleys are mounted on the engine drive shaft and can be selectively connected to the drive shaft through operation of a centrifugal clutch mechanism. A single belt is trained over the pulleys on the drive shaft, as well as over pulleys on the eccentric shafts. In this regard, the belt passes over one of the pulleys on the drive shaft, then around a pulley on one of the eccentric shafts, then back around the second pulley on the drive shaft and then around the pulley on the second eccentric shaft. By connecting one of the drive shaft pulleys to the drive shaft through operation of the clutch, both eccentric shafts will be operated in the same direction to move the compactor in a forward direction. By connecting the drive shaft to the other of the drive shaft pulleys through operation of the clutch, the eccentric shafts will be driven in the opposite direction to move the compactor in reverse direction.

The drive mechanism of the invention also incorporates a novel centrifugal clutch construction. The clutch includes a pair of hubs, which are secured to the drive shaft, and the drive shaft pulleys are mounted for rotation on the respective hubs. A side of each hub is provided with a recess and the recesses of the two hubs are in facing and mating relation.

A plurality of circumferentally spaced clutch members or shoes are located around the shaft and are shiftable longitudinally from the recess of one of the hubs to the recess of the other of the hubs. The clutch shoes are biased inwardly toward the drive shaft and are designed so that they will move outwardly under centrifugal force as the engine is operated, to thereby engage the respective drive shaft pulley with the engine drive shaft.

To shift the clutch, a plurality of rods extend through aligned openings in the hubs and are received within radial slots in the clutch shoes. Corresponding ends of the rods project beyond one of the hubs and are connected to an operating member. Through actuation of the operating member, the rods can be moved axially, when the engine is at an idle speed, to thereby shift the clutch shoes from the recess of one hub to the recess of the other hub. On an increase in speed of the engine, the shoes will then move outwardly under centrifugal force to provide a driving connection between drive shaft and the corresponding drive shaft pulley.

As only a single belt is employed and is connected to both eccentric shafts, tensioning of the belt is simplified over a construction utilizing two separate belts. The tensioning can readily be accomplished by moving the engine vertically, relative to the compactor plate.

With the construction of the invention, the belt is wrapped around each eccentric shaft through an arc greater than 180 degrees. The increased wrap on the eccentric shafts enables increased power to be transmitted to the eccentric shafts.

Using a single belt to drive both eccentric shafts also facilitates belt replacement over a system using two separate belts. With a system using two belts, the outer belt must be removed in order to replace the inner belt.

With the construction of the invention the two eccentric shafts operate in phase to obtain a greater vibrational output for a given size of eccentric shaft, or alternately, the size of the eccentric shafts and the supporting bearings can be reduced for the same vibrational output.

As the eccentric shafts are rotated simultaneously, and are located on either side of the fore-and-aft midpoint of the compactor plate, a more uniform vibrational output is achieved throughout the surface area of the compactor plate. Further, the power source or gasoline engine, can be located between the eccentric shafts, thus providing a lower profile and center of gravity for the compactor.

Other objects and advantages will appear during the course of the following description.

DESCRIPTION OF THE DRAWINGS

FIG. 1 is a perspective view of a reversible vibratory compactor incorporating the drive mechanism of the invention;

FIG. 2 is longitudinal section of the centrifugal clutch;

DESCRIPTION OF THE ILLUSTRATED EMBODIMENT

Figures 3, 4:
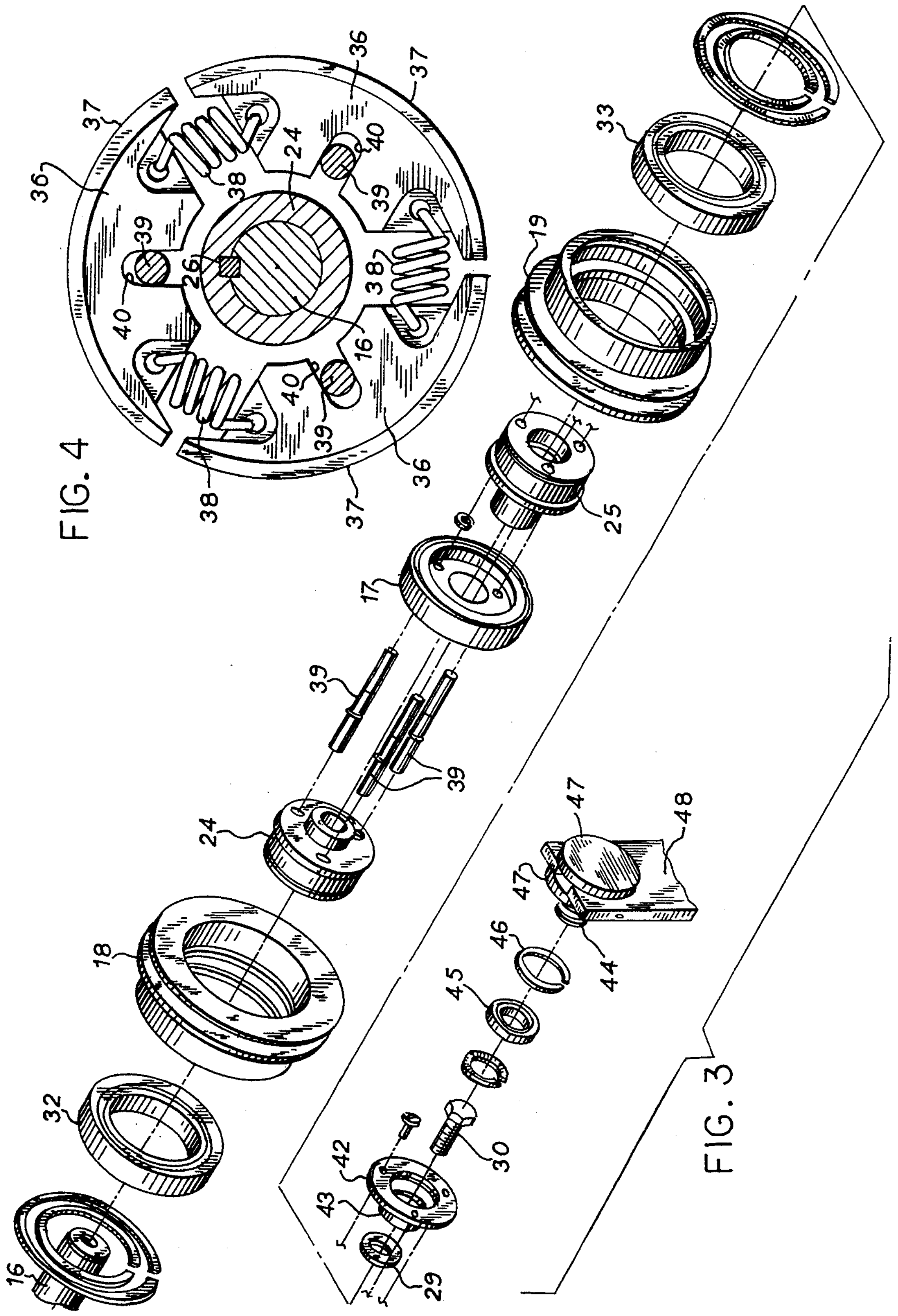
FIG. 3 is an exploded view of the clutch.
FIG. 4 is a plan view of the clutch.

FIG. 1 illustrates a reversible vibratory compactor 1, including a frame 2 having a pair of spaced parallel side plates 3, the lower edges of which are secured to a compactor plate 4 which is adapted to engage the soil or other material to be compacted. The forward and rear ends of the compactor plate are inclined upwardly, as indicated by 5, and each side edge of plate 4 is provided with an upturned flange 6. A handle 7 to be engaged by an operator is connected to frame 2.

A pair of eccentric vibratory shafts 8 and 9 are journaled in the side plates 3 by bearing assemblies 10, arid each shaft 8, 9 carries one or more eccentric weights 11. The eccentric weights 11 on shafts 8 and 9 are in the same phase relation, meaning that if the eccentricity of one shaft is at the two o'clock position, the eccentricity of the other shaft is at the same two o'clock position. Rotation of eccentric shafts 8 and 9 provide a vibratory action for compactor plate 4.

A power source, such as a gasoline engine 12, is supported on the mounting plate 13, which in turn is connected to plate 14 of frame 2 through resilient isolation mounts 15. Isolation mounts 15, being formed of resilient material such as rubber, act to minimize the transmission of vibrations from frame 2 to engine 12 and handle 7.

Engine 12 includes a drive shaft 16 and a centrifugal clutch mechanism 17 selectively connects the drive shaft 16 to one of two pulleys 18 and 19, which are mounted concentrically of the drive shaft.

As seen in FIG. 1, a belt 20, which preferably has a hexagonal cross section, is trained between the drive shaft pulleys 18 and 19 and a pulley 21, mounted on eccentric shaft 8 and a pulley 22 mounted on eccentric shaft 9. More specifically, belt 20 passes downwardly from the inner drive pulley 18, around pulley 21 then upwardly around the second drive shaft pulley 19 and then downwardly around the pulley 22 on eccentric shaft 9. When the pulley 18 is connected to drive shaft 16 through operation of clutch 17, both shafts 8 and 9 will be driven in one direction via the belt 20. Conversely, when pulley 19 is operably connected to drive shaft 16 through operation of clutch 17 both of the eccentric shafts 8, 9 will be driven in the opposite direction, thus providing forward and reverse travel for the compactor.

To synchronize rotation of shafts 8 and 9 it is contemplated that a timing belt, not shown, can be connected between the shafts 8 and 9. The timing belt can be connected to pulleys mounted alongside pulleys 21 and 22 or alternately, the pulleys for the timing belt can be mounted on the opposite ends of shafts 8 and 9, on the far side of the compactor, as shown in FIG. 1.

The novel clutch mechanism, is illustrated in FIGS. 2–4. As shown in FIG. 2, a pair of hubs 24 and 25, are connected to drive shaft 16 through a key 26, so that the hubs rotate with the drive shaft. To retain the hubs axially on the drive shaft, a snap ring 27 is mounted in a groove in the shaft and bears against a shoulder 28 formed on hub 24. In addition, a washer 29, which is secured to the end of shaft 16 through bolt 30, bears against a shoulder 31 formed in the other hub 25. With this construction, hubs 24 and 25 will be retained in position on shaft 16 between the snap ring 27 and washer 29.

The drive shaft pulleys 18 and 19 are mounted for rotation on the respective hubs 24 and 25 by bearings 32 and 33.

As shown in FIG. 2 the inner faces of hubs 24 and 25 are provided with facing recesses 34 and 35, respectfully, and a plurality of clutch members or shoes 36 are shiftable between recesses 34 and 35. FIG. 2 shows the clutch shoes 36 being located within recess 34 in hub 24.

As illustrated in FIG. 4, three clutch shoes 36 are employed and each shoe is provided with an arcuate or curved outer surface 37 which is adapted to engage the inner surface of the respective pulley 18 and 19. Clutch shoes 36 are biased to an inner position by extension springs 38 which connect the adjacent edges of the shoes. As the motor speed increases shoes 36 will be moved outwardly under centrifugal force, causing the outer surfaces 37 to engage the inner surface of the respective pulley 18 and 19 to provide a driving connection between the drive shaft 16 and the pulley.

To shift the clutch shoes 36 between recesses 34 and 35 a plurality of operating rods 39 extend through radial slot 40 in each shoe. The radial slot 40 permits the shoes 36 to move radially relative to the respective rod. Snap rings 41 are mounted within grooves in each rod 39 and are located on either side of the shoe 36. Thus, longitudinal movement of rods 39 will shift the shoes 36 longitudinally between the recesses 34 and 35 in hubs 24 and 25.

Rods 39 rotate with hubs 24 and drive shaft 16 and are mounted for sliding movement within aligned openings in hubs 24 and 25. The corresponding ends of rods 39 are connected to an annular disc 42, which is located outboard of hub 25. Disc 42 is provided with an inner annular flange 43, which is located within a recess in the outer face of hub 25. Flange 43 is connected to a non-rotatable pin 44 through a bearing 45. Bearing 45 is mounted against a shoulder in flange 43 and retained against the shoulder by a snap ring 46. As the pin 44 does not rotate, the bearing 45 enables disc 42, rods 39 and hubs 24 and 25 to rotate relative to the pin.

As shown in FIG. 2 the outer end of pin 44 carries a pair of discs 47 which straddle the upper end of an arm 48. Arm 48 is mounted for sliding movement on a guide rod 49 that extends outwardly from the engine and the lower end of the arm is connected to an operating rod 50. The operating rod 50 can be connected in a conventional manner through a cable system to a lever on the handle 7 so that the operator, by moving the lever, can move the arm 48 along with the rods 39 to shift clutch 17 within the recesses in hubs 24 and 25.

When the engine speed is increased to a preselected value and the clutch shoes 36 are in the position in recess 34 of hub 24, as shown in FIG. 2, the clutch shoes 36 will be moved outwardly by centrifugal force causing the outer surfaces 37 of the shoes to engage the inner surface of pulley 18, thus providing a connection between drive shaft 16 and pulley 18. Rotation of pulley 18, while pulley 19 is idling, will cause the eccentric shafts 8 and 9 to rotate in the same direction to move the compactor in a forward direction. To reverse directional movement of the compactor, the engine speed is reduced to idle and arm 48 is moved outwardly, causing the clutch 17 to be moved longitudinally through rods 39 to the recess 35 in hub 25. On an increase in engine speed, the clutch shoes 36 will then move outwardly, bringing the surfaces 37 into engagement with the inner surface of hub 25 to provide a driving connection between pulley 19 and the drive shaft 16. With pulley 19 being driven and pulley 18 idling, the eccentric shafts 8 and 9 will be driven in the opposite direction causing reverse movement of the compactor.

The use of a single belt 20 to drive the eccentric shafts 8 and 9 provides distinct advantages over the use of dual belts. Specifically, the belt tensioning operation is simplified and tension on the belt can readily be adjusted by moving the vertical position of the engine relative to the compactor plate. As a further advantage, belt 20 is wrapped around the pulleys 21 and 22 through an arc of more than 180°, providing a more effective drive to the eccentric shafts. With this increased wrap, a smaller width belt can be utilized and as less heat will be generated in a smaller width belt than in a wider belt, the belt service life is increased.

Various modes of carrying out the invention are contemplated as being within the scope of the following claims, particularly pointing out and distinctly claiming the subject matter which is regarded as the invention.

I claim:

1. A vibratory compactor, comprising a frame, compaction means mounted on the frame and adapted to engage in material to be compacted, drive means mounted on the frame and including a drive shaft, a first support member and a second support member mounted on the drive shaft, a pair of eccentric shafts mounted for rotation on the frame, a third support member connected to a first of said eccentric shafts, a fourth support member connected to a second of said eccentric shafts, and a single endless flexible connecting member operably connecting the first, second, third and fourth support members, said connecting member being constructed and arranged so that both eccentric shafts rotate simultaneously and in the same direction.

2. The compactor of claim 1, wherein each eccentric shaft includes a weight mounted eccentrically on the axis of said shaft, said eccentric weights being in the same phase relation on the respective eccentric shafts.

3. The compactor of claim 1, wherein said support members comprise pulleys and said flexible connecting member is a belt.

4. The compactor of claim 1, and including a clutch means for selectively interconnecting said drive shaft with said first and second support members.

5. The compactor of claim 4, wherein said clutch means is mounted to move between a first position wherein said clutch means provides a connection between said drive shaft and said first support member and a second position where said clutch means provides a connection between said drive shaft and said second support member, and operating means for moving said clutch means between said first and second positions.

6. A vibratory compactor, comprising a frame, compaction means mounted on the frame and adapted to engage a material to be compacted, drive means mounted on the frame and including a drive shaft, a pair of eccentric shafts mounted for rotation on the frame, a first pulley and a second pulley both mounted on said drive shaft, means for selectively connecting each of said pulleys to said drive shaft, a third pulley mounted on one of said eccentric shafts, a fourth pulley mounted on the other of said eccentric shafts, and a single endless flexible member interconnecting said first and second pulleys and said third and fourth pulleys.

7. The compactor of claim 6, and including clutch means for selectively interconnecting said drive shaft with said first and second pulleys.

8. The compactor of claim 7, wherein said clutch means comprises a clutch member mounted for axially movement on said drive shaft from a first position where said clutch member is engageable with said first pulley to a second position where said clutch member is engageable with said second pulley.

9. The compactor of claim 8, wherein said clutch member is movable radially when in each of said positions by centrifugal force on rotation of said drive shaft from an inner disengaged position to an outer engaged position where said clutch member will engage the respective pulley.

10. A vibratory compactor, comprising a frame, compaction means mounted on the frame and adapted to engage material to be compacted, drive means mounted on the frame and including a drive shaft, a pair of eccentric shafts mounted for rotation on the frame, a first pulley and a second pulley mounted on the drive shaft, a third pulley mounted on one of said eccentric shafts, a fourth pulley mounted on the other of said eccentric shafts, a single belt interconnecting said first, second, third and fourth pulleys, said belt being constructed and arranged to drive said third and fourth pulleys in the same direction, centrifugal clutch means for selectively engaging said drive shaft with said first and second pulleys whereby engagement of said drive shaft with said first pulley will operate through said belt to drive said third and fourth pulleys in one direction and engagement of said drive shaft with said second pulley will operate through said belt to drive said third and fourth pulleys in the opposite direction.

11. A centrifugal clutch construction, comprising drive shaft means, a pair of driven members mounted for rotation on said drive shaft means, a centrifugal clutch mounted for axially movement relative to said drive shaft means from a first position where said clutch is radially aligned with a first of said driven members to a second position where said clutch is radially aligned with a second of said driven members, operating means for selectively moving said clutch between said first and second positions, said clutch including a plurality of movable clutch members constructed and arranged to be moved outwardly by centrifugal force on rotation of said drive shaft means to affect engagement with the respective driven member.

12. The clutch construction of claim 11, and including a plurality of said clutch members circumferentally spaced around said drive shaft means.

13. The clutch construction claim 11, and including biasing means for biasing said clutch member inwardly toward said drive shaft means.

14. The clutch construction of claim 11, wherein said operating means comprises an operating rod disposed parallel to said drive shaft means and slidably disposed within an opening in said drive shaft means, said rod being connected to said clutch member, means for permitting radial movement of said clutch member relative to said rod, one end of said rod projecting beyond an end of said drive shaft means, and actuating means connected to said rod for moving said rod axially to thereby shift said clutch member between said first and second positions.

15. A centrifugal clutch construction comprising a drive shaft, a pair of hubs connected to said drive shaft, a driven member journaled on each hub, a radially extending face of each hub having a recess, said recesses facing each other in mating relation, a clutch member mounted for axially movement relative to said drive shaft and shiftable between said recesses, a rod disposed parallel to said drive shaft and extending freely through aligned openings in said hubs, means for connecting said rod to said clutch member to effect shifting of said clutch member between said recesses on axially movement of said rod, means for permitting radially movement of said clutch member relative to said rod, an end of said rod projecting beyond a one of said hubs, operating means connected to said end of said rod for moving said rod axially and thereby shifting said clutch member between said recesses, said clutch member being constructed and arranged to move radially outward under centrifugal force on rotation of said drive shaft to thereby cause engagement of said clutch member with the respective driven member, and biasing means for biasing the clutch member inwardly toward said drive shaft.

16. The clutch construction of claim 15, wherein said operating means comprises an operating member mounted in axially alignment with said drive shaft, and journaling means for connecting said operating member to said rod whereby said rod can rotate about the axis of said operating member.

* * * * *